US012701582B2

(12) United States Patent
Mansour et al.

(10) Patent No.: US 12,701,582 B2
(45) Date of Patent: Aug. 4, 2026

(54) SYSTEMS AND METHODS FOR ENHANCING PHYSICAL DOWNLINK CONTROL CHANNEL CAPACITY

(71) Applicant: T-MOBILE INNOVATIONS LLC, Overland Park, KS (US)

(72) Inventors: Nagi A. Mansour, Arlington, VA (US); Akin Ozozlu, McLean, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 473 days.

(21) Appl. No.: 18/112,884

(22) Filed: Feb. 22, 2023

(65) Prior Publication Data

US 2024/0284474 A1 Aug. 22, 2024

(51) Int. Cl.
*H04W 72/232* (2023.01)
*H04L 27/26* (2006.01)

(52) U.S. Cl.
CPC ..... *H04W 72/232* (2023.01); *H04L 27/26035* (2021.01)

(58) Field of Classification Search
None
See application file for complete search history.

(56) References Cited

U.S. PATENT DOCUMENTS

| | | | | |
|---|---|---|---|---|
| 9,622,233 B1 * | 4/2017 | Mansour | ............... | H04L 5/0053 |
| 2012/0082023 A1 * | 4/2012 | Higuchi | .............. | H04L 27/2634 |
| | | | | 370/310 |
| 2012/0207084 A1 * | 8/2012 | Seo | ..................... | H04L 27/2647 |
| | | | | 370/315 |
| 2014/0204842 A1 * | 7/2014 | Kim | .................... | H04W 52/146 |
| | | | | 370/328 |
| 2019/0268889 A1 * | 8/2019 | Kim | ...................... | H04L 5/0051 |
| 2022/0256571 A1 * | 8/2022 | Lo | .......................... | H04W 24/08 |
| 2023/0179377 A1 * | 6/2023 | Khoshnevisan | ........ | H04L 5/001 |
| | | | | 370/330 |

* cited by examiner

*Primary Examiner* — Clemence S Han

(74) *Attorney, Agent, or Firm* — SHOOK, HARDY & BACON L.L.P.

(57) ABSTRACT

Systems and methods are provided for enhancing physical downlink control channel (PDCCH) capacity. To do so, a first PDCCH and a second PDCCH are communicated in single orthogonal frequency division multiplexing (OFDM) symbol of a subframe, freeing the remainder of the PDCCH code space for data. Initially, a transmission is communicated, by a node configured to wirelessly communicate with a user equipment (UE), to the UE. The transmission includes a first PDCCH in a first OFDM symbol of a subframe. The transmission also includes a second PDCCH in the first OFDM symbol of the subframe.

16 Claims, 4 Drawing Sheets

100

102

122

NETWORK

110

PDCCH
ENHANCEMENT
ENGINE

108

106

200

110

PDCCH ENHANCEMENT
ENGINE

202

FIRST PDCCH
COMPONENT

204

SECOND PDCCH
COMPONENT

PDCCH1

PDCCH2

400

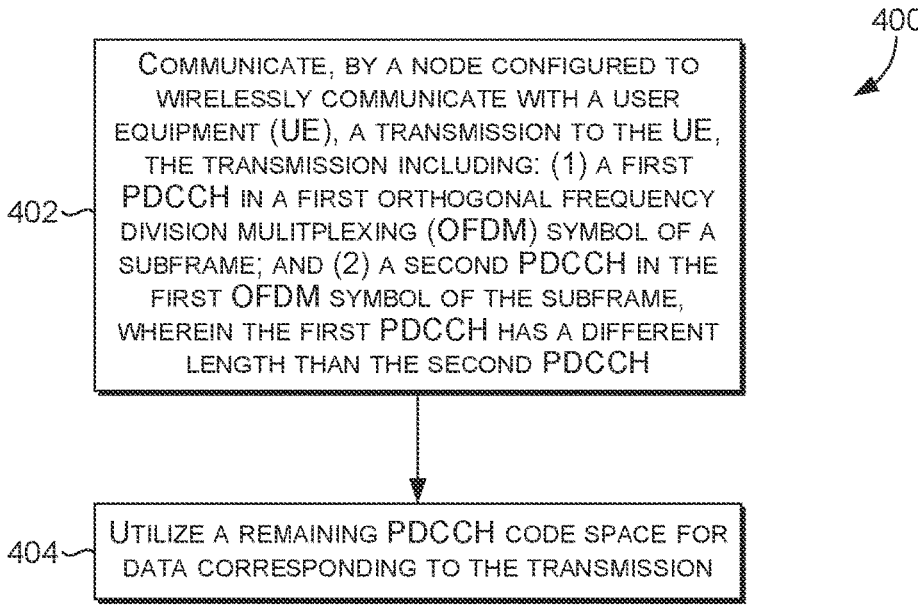

402 — COMMUNICATE, BY A NODE CONFIGURED TO WIRELESSLY COMMUNICATE WITH A USER EQUIPMENT (UE), A TRANSMISSION TO THE UE, THE TRANSMISSION INCLUDING: (1) A FIRST PDCCH IN A FIRST ORTHOGONAL FREQUENCY DIVISION MULITPLEXING (OFDM) SYMBOL OF A SUBFRAME; AND (2) A SECOND PDCCH IN THE FIRST OFDM SYMBOL OF THE SUBFRAME, WHEREIN THE FIRST PDCCH HAS A DIFFERENT LENGTH THAN THE SECOND PDCCH

404 — UTILIZE A REMAINING PDCCH CODE SPACE FOR DATA CORRESPONDING TO THE TRANSMISSION

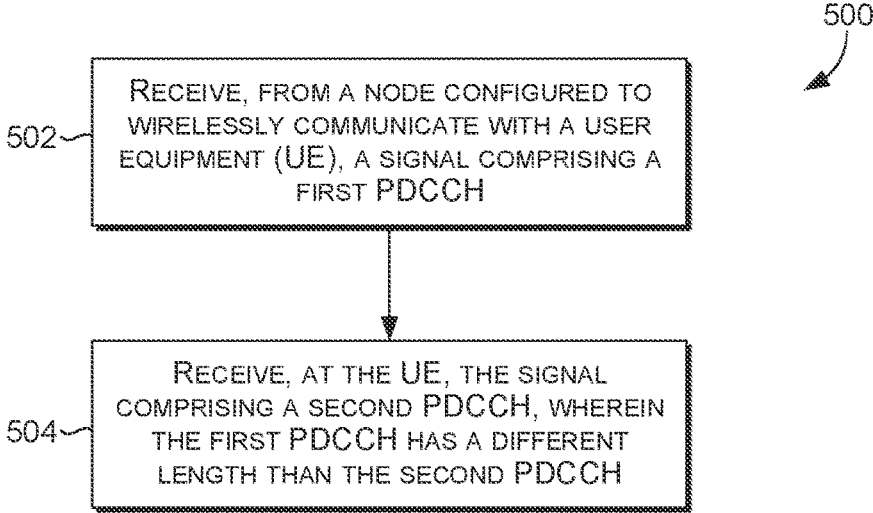

502 — RECEIVE, FROM A NODE CONFIGURED TO WIRELESSLY COMMUNICATE WITH A USER EQUIPMENT (UE), A SIGNAL COMPRISING A FIRST PDCCH

504 — RECEIVE, AT THE UE, THE SIGNAL COMPRISING A SECOND PDCCH, WHEREIN THE FIRST PDCCH HAS A DIFFERENT LENGTH THAN THE SECOND PDCCH

FIG. 5

SYSTEMS AND METHODS FOR ENHANCING PHYSICAL DOWNLINK CONTROL CHANNEL CAPACITY

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

In aspects set forth herein, systems and methods are provided for enhancing physical downlink control channel (PDCCH) capacity. More particularly, in aspects set forth herein, systems and methods enable a first PDCCH and a second PDCCH to be communicated in single orthogonal frequency division multiplexing (OFDM) symbol of a subframe, freeing the remainder of the PDCCH code space for data. Initially, a transmission is communicated, by a node configured to wirelessly communicate with a user equipment (UE), to the UE. The transmission includes a first PDCCH in a first OFDM symbol of a subframe. The transmission also includes a second PDCCH in the first OFDM symbol of the subframe.

BRIEF DESCRIPTION OF THE SEVERAL VIEWS OF THE DRAWINGS

Implementations of the present disclosure are described in detail below with reference to the attached drawing figures, wherein:

FIG. 4 depicts a flow diagram of a method for enhancing PDCCH capacity, in accordance with aspects herein;

FIG. 5 depicts a flow diagram of a method for enhancing PDCCH capacity, in accordance with aspects herein.

DETAILED DESCRIPTION

Figure 1:
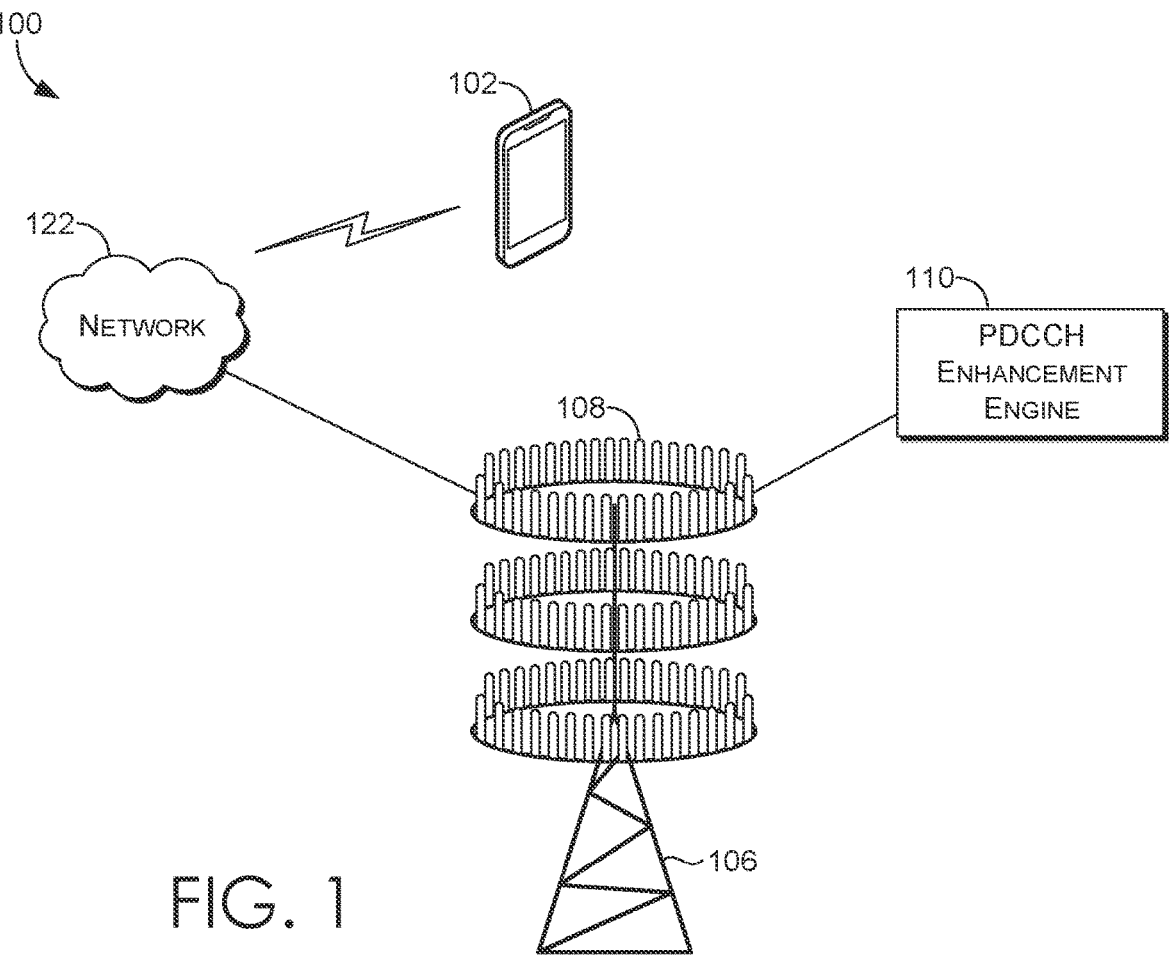
FIG. 1 depicts a diagram of an exemplary network environment in which implementations of the present disclosure may be employed.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
CD-ROM Compact Disk Read Only Memory
CDMA Code Division Multiple Access
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
PC Personal Computer
PCS Personal Communications Service
PDA Personal Digital Assistant
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment Further, various technical terms are used throughout this description. An illustrative resource that fleshes out various aspects of these terms can be found in Newton's Telecom Dictionary, 25th Edition (2009).

As used herein, the term "node" is used to refer to network access technology, such as eNode, gNode, etc. In other aspects, the term "node" may be used to refer to one or more antennas being used to communicate with a user device.

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., cell sites, cell towers) to provide network coverage. The base stations are employed to broadcast and transmit transmissions to user devices of the telecommunications network. An access point may be considered to be a portion of a base station that may comprise an antenna, a radio, and/or a controller. In aspects, an access point is defined by its ability to communicate with a user equipment (UE), such as a wireless communication device (WCD), according to a single protocol (e.g., 3G, 4G, LTE, 5G, and the like); however, in other aspects, a single access point may communicate with a UE according to multiple protocols. As used herein, a base station may comprise one access point or more than one access point. Factors that can affect the telecommunications transmission include, e.g., location and size of the base stations, and frequency of the transmission, antenna array configuration corresponding to both the access point and the UE, among other factors. The base stations are employed to broadcast and transmit transmissions to user devices of the telecommunications network.

As employed herein, a UE (also referenced herein as a user device) or WCD can include any device employed by an end-user to communicate with a wireless telecommunications network. A UE can include a mobile device, a mobile broadband adapter, or any other communications device employed to communicate with the wireless telecommunications network. A UE, as one of ordinary skill in the art may appreciate, generally includes one or more antenna coupled to a radio for exchanging (e.g., transmitting and receiving) transmissions with a nearby base station.

In conventional cellular communications technology, beamforming is a signal processing technique that enables a node to send targeted beams of data to users. Not only does this reduce interference, it also makes more efficient use of the frequency spectrum. PDCCH beamforming is a type of beamforming that can extend coverage to users using the same amount of energy. By leveraging a narrower beam. PDCCH beamforming can extend coverage to UEs farther away from the node than with traditional beamforming.

However. PDCCH beamforming is currently limited to a single PDCCH per UE. In other words, PDCCH beamforming does not currently support utilizing multiple PDCCHs to provide additional PDCCH capacity to a single UE.

The present disclosure is directed to enhancing PDCCH capacity. To do so, a first PDCCH and a second PDCCH are communicated in a single OFDM symbol of a subframe, freeing the remainder of the PDCCH code space for data. Initially, a transmission is communicated, by a node configured to wirelessly communicate with a UE, to the UE. The transmission includes a first PDCCH in a first OFDM symbol of a subframe. The transmission also includes a second PDCCH in the first OFDM symbol of the subframe.

Accordingly, a first aspect of the present disclosure is directed to a method for enhancing PDCCH capacity. The method comprises communicating, by a node configured to wirelessly communicate with UE, a transmission to the UE. The transmission includes a first PDCCH in a first OFDM symbol of a subframe. The transmission also includes a second PDCCH in the first OFDM symbol of the subframe. The first PDCCH has a different length than the second PDCCH. The method also comprises utilizing a remaining PDCCH code space for data corresponding to the transmission.

A second aspect of the present disclosure is directed to a method for enhancing PDCCH capacity. The method comprises receiving, from a node configured to wirelessly communicate with a UE, a signal comprising a first PDCCH. The method also comprises receiving, at the UE, the signal comprising a second PDCCH. The first PDCCH has a different length than the second PDCCH.

Another aspect of the present disclosure is directed to a system for enhancing PDCCH capacity. The system comprises a UE and a node configured to wirelessly communicate with the UE. Then node is configured to multiply a PDCCH by an orthogonal code. The PDCCH represents a first PDCCH and the PDCCH multiplied by the orthogonal code represents a second PDCCH. The node is also configured to communicate in PDCCH code space of a signal to the UE. The signal includes the first PDCCH and the second PDCCH.

Turning to FIG. 1, a network environment suitable for use in implementing embodiments of the present disclosure is provided. Such a network environment is illustrated and designated generally as network environment 100. Network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

Figure 6:
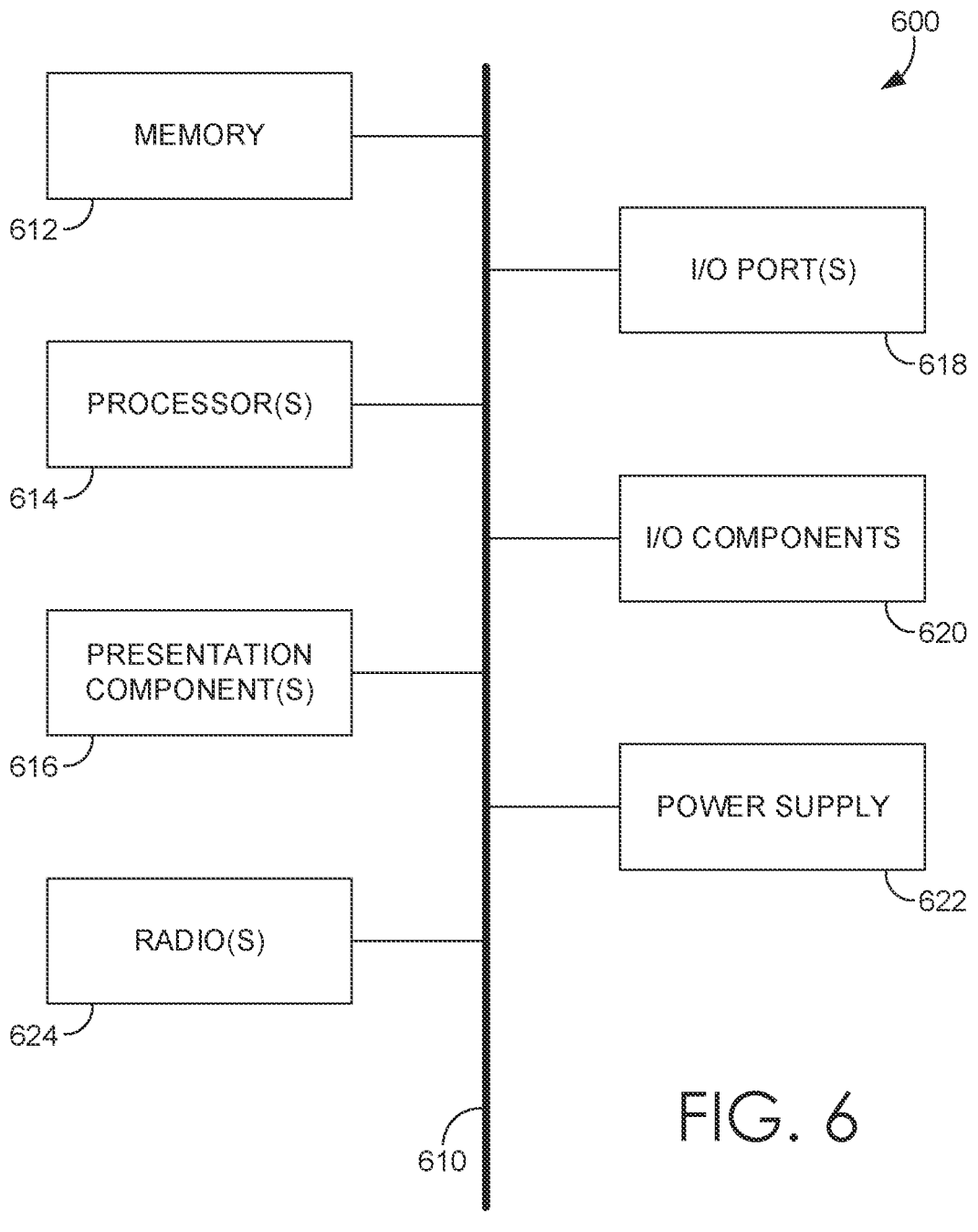
FIG. 6 depicts a diagram of an exemplary computing environment suitable for use in implementations of the present disclosure.

A network cell may comprise a base station to facilitate wireless communication between a communications device within the network cell, such as communications device 600 described with respect to FIG. 6, and a network. As shown in FIG. 1, communications device may be UE 102. In the network environment 100, UE 102 may communicate with other devices, such as mobile devices, servers, etc. The UE 102 may take on a variety of forms, such as a personal computer, a laptop computer, a tablet, a netbook, a mobile phone, a Smart phone, a personal digital assistant, or any other device capable of communicating with other devices. For example, the UE 102 may take on any form such as, for example, a mobile device or any other computing device capable of wirelessly communication with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, UE 102 comprises a wireless or mobile device with which a wireless telecommunication network(s) can be utilized for communication (e.g., voice and/or data communication). In this regard, the UE 102 can be any mobile computing device that communicates by way of, for example, a 5G network.

The UE 102 may utilize network 122 to communicate with other computing devices (e.g., mobile device(s), a server(s), a personal computer(s), etc.). In embodiments, network 122 is a telecommunications network, or a portion thereof. A telecommunications network might include an array of devices or components, some of which are not shown so as to not obscure more relevant aspects of the invention. Components such as terminals, links, and nodes (as well as other components) may provide connectivity in some embodiments. Network 122 may include multiple networks, as well as being a network of networks, but is shown in more simple form so as to not obscure other aspects of the present disclosure. Network 122 may be part of a telecommunications network that connects subscribers to their immediate service provider. In embodiments, network 122 is associated with a telecommunications provider that provides services to user devices, such as UE 102. For example, network 122 may provide voice services to user devices or corresponding users that are registered or subscribed to utilize the services provided by a telecommunications provider. Although it is contemplated network 122 can be any communication network providing voice and/or data service(s), such as, for example, a 1× circuit voice, a 3G network (e.g., CDMA, CDMA1000, WCDMA, GSM, UMTS), a 4G network (WiMAX, LTE, HSDPA), or the like, network 122 is depicted in FIG. 1 as a 5G network.

The network environment 100 may include a database (not shown). The database may be similar to the memory component 612 in FIG. 6 and can be any type of medium that is capable of storing information. The database can be any collection of records (e.g., network or device information). In one embodiment, the database includes a set of embodied computer-executable instructions that, when executed, facilitate various aspects disclosed herein. These embodied instructions will variously be referred to as "instructions" or an "application" for short.

As previously mentioned, UE 102 may communicate with other devices by using a base station, such as base station 106. In embodiments, base station 106 is a wireless communications station that is installed at a fixed location, such as at a radio tower, as illustrated in FIG. 1. The radio tower may be a tall structure designed to support one or more antennas 108 for telecommunications and/or broadcasting. In other embodiments, base station 106 is a mobile base station. The base station 106 may be an MMU and include gNodeB for mMIMO/5G communications via network 122. In this way, the base station 106 can facilitate wireless communication between UE 102 and network 122.

As stated, the base station 106 may include a radio (not shown) or a remote radio head (RRH) that generally communicates with one or more antennas associated with the base station 106. In this regard, the radio is used to transmit signals or data to an antenna 108 associated with the base station 106 and receive signals or data from the antenna 108. Communications between the radio and the antenna 108 can occur using any number of physical paths. A physical path, as used herein, refers to a path used for transmitting signals or data. As such, a physical path may be referred to as a radio frequency (RF) path, a coaxial cable path, cable path, or the like.

The antenna 108 is used for telecommunications. Generally, the antenna 108 may be an electrical device that converts electric power into radio waves and converts radio waves into electric power. The antenna 108 is typically positioned at or near the top of the radio tower as illustrated in FIG. 1. Such an installation location, however, is not intended to limit the scope of embodiments of the present invention. The radio associated with the base station 106 may include at least one transceiver configured to receive and transmit signals or data.

Continuing, the network environment 100 may further include a PDCCH enhancement engine 110. The PDCCH enhancement engine 110 may be configured to, among other things, enhance PDCCH capacity, in accordance with the present disclosure. Though PDCCH enhancement engine 110 is illustrated as a component of base station 106 in FIG. 1, it may be a standalone device (e.g., a server having one or more processors), a component of the UE 102, a service provided via the network 122, and/or may be remotely located.

Figure 2:
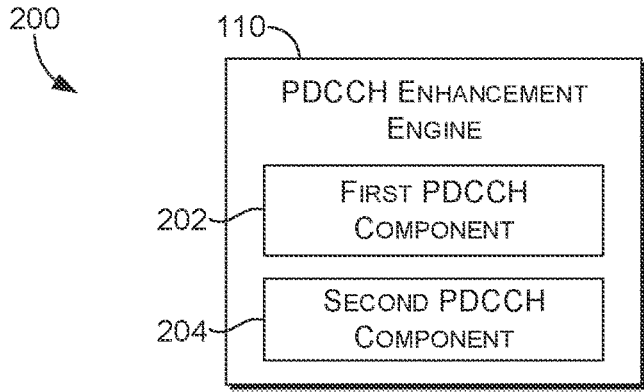
FIG. 2 illustrates an exemplary PDCCH enhancement engine, in accordance with aspects herein.

Referring now to FIG. 2, the PDCCH enhancement engine 110 may include, among other things, first PDCCH component 202 and second PDCCH component 204. The PDCCH enhancement engine 110 may receive, among other things, data from user devices, such as UE 102, within a network cell associated with a particular base station 106, or from the base station 106 itself. For example, the PDCCH enhancement engine 110 may receive a signal from UE 102 to the base station 106 or a signal from the base station 106 to the UE 102.

First PDCCH component 202 dynamically sends control information to the UE 102 and the UE 102 needs to read the control information to know when (i.e., time domain), where (i.e., frequency domain), and how to demodulate/decode PDSCH, and when, where, and how to assemble and send PUSCH data (uplink). PDCCH code space is typically the first three OFDM symbols in each subframe communicated by the node.

Second PDCCH component 204 also dynamically sends control information to the UE 102 and the UE 102 needs to read the control information to know when (i.e., time domain), where (i.e., frequency domain), and how to demodulate/decode PDSCH, and when, where, and how to assemble and send PUSCH data (uplink). However, second PDCCH component 204 multiplies the PDCCH by an orthogonal code, resulting in a second PDCCH. More simply, first PDCCH component 202 and second PDCCH component 204 of the PDCCH enhancement engine 100 communicates, in PDCCH code space of a signal to the UE, the signal including the first PDCCH and the second PDCCH. For clarity, the first PDCCH is the PDCCH.

As a result, the PDCCH capacity is enhanced because the first PDCCH and the second PDCCH are communicated in the same (i.e., the first) symbol of each subframe communicated by the PDCCH enhancement engine 100. In other words, the PDCCH capacity is enhanced because the remainder of the PDCCH code space (the second and third symbols of each subframe) can be utilized for data.

Figure 3:
FIG. 3 illustrates a UE being provided enhanced PDCCH capacity, in accordance with aspects herein.

Turning to FIG. 3, a diagram 300 is provided illustrating a UE being provided enhanced PDCCH capacity. As illustrated, UE 306 may communicate with other devices by using a base station, such as base station 302. In embodiments, base station 302 is a wireless communications station that supports one or more antennas 304 for telecommunications and/or broadcasting. The base station 302 may be an MMU and include gNodeB for mMIMO/5G communications via network. In this way, the base station 302 can facilitate wireless communication between UE 306 and network.

Base station 302 may communicate a signal to UE 306. The signal is represented by subframe 330. Each subframe comprises OFDM symbols (e.g., 14 symbols). PDCCH code space 340 is typically the first three OFDM symbols (e.g., symbol 341, symbol 342, and symbol 343). The remainder of the OFDM symbols (e.g., symbols 344) are typically used for data. As illustrated, the signal comprises PDCCH1 310 and PDCCH2 320. Each of PDCCH1 310 and PDCCH2 320 are communicated in the first OFDM symbol 341 of subframe 330. Because base station 302 has multiplied PDCCH1 310 by an orthogonal code to generate PDCCH2 320, UE 306 is able to interpret each of PDCCH1 310 and PDCCH2 320, even though they are communicated in the same OFDM symbol. As can be appreciated, this allows the remainder of the PDCCH code space (e.g., symbol 342, symbol 343, and symbols 344) to be utilized for data, thereby enhancing the PDCCH code space.

Referring to FIG. 4, a flow diagram is provided depicting a method 400 for enhancing PDCCH capacity, in accordance with aspects of the present invention. Method 400 may be performed by any computing device (such as computing device described with respect to FIG. 6) with access to a PDCCH enhancement engine (such as the one described with respect to FIG. 2) or by one or more components of the network environment described with respect to FIG. 1 (such as UE 102, base station 106, or PDCCH beamforming enhancement 110).

Initially, at step 402, a transmission is communicated by a node configured to wirelessly communicate with a UE. The transmission includes a first PDCCH in a first OFDM symbol of a subframe. In aspects, prior to communicating, the node multiplies the first PDCCH by a first orthogonal code.

The transmission communicated by the node also includes a second PDCCH. The second PDCCH is also in the first OFDM symbol of the subframe and has a different length than the first PDCCH. In aspects, prior to communicating, the node multiplies the second PDCCH by a second orthogonal code. As can be appreciated, the first PDCCH and the second PDCCH can be distinguished by the UE, even though they are communicated in the same OFDM symbol of the subframe. This enables the remaining PDCCH code space (the next two OFDM symbols of the subframe) to be utilized for data, at step 404, which increases the capacity for communication between the node and the UE.

In aspects, the node communicates an indication to the UE that the node supports providing more than one PDCCH via a single transmission. Upon the indication being communicated, in some aspects, the UE may generate and communicate orthogonal codes to the node. Alternatively, the node may generate and communicate the orthogonal codes to the UE. In each aspect, the UE and the node are able to utilize the orthogonal codes to distinguish between a first PDCCH and a second PDCCH.

In practice, transmission comprising signals S1*C1 and S2*C2 may be received from the node by the UE. The UE may interpret the transmission communicated by the node by multiplying the first signal S1*C1 by the first orthogonal code C1. The result will be S1 and the communication can be interpreted. Similarly, the UE may interpret the transmission communicated by the node by multiplying the second signal S2*C2 by the second orthogonal code C2. The result will be S2 and the communication can be interpreted.

In contrast, if the UE attempts to interpret the second signal S2 using the first orthogonal code C1 (by multiplying the second signal S2 by the first orthogonal code C1), the result will be zero and the UE will be unable to interpret the second signal. Similarly, if the UE attempts to interpret the first signal S1 from the node using the second orthogonal code C2 (by multiplying the first signal S1 by the second orthogonal code C2), the result will be zero and the UE will be unable to interpret the first signal.

In this way, a single transmission from the node enables the node to communicate with the UE by utilizing a first PDCCH and a second PDCCH in the same OFDM symbol of the subframe. This effectively increases the amount of each subframe that may be utilized to communicate data from the node to the UE.

In FIG. 5, a flow diagram is provided depicting a method 500 for enhancing PDCCH capacity, in accordance with aspects of the present invention. Method 500 may be performed by any computing device (such as computing device described with respect to FIG. 6) with access to a PDCCH enhancement engine (such as the one described with respect to FIG. 2) or by one or more components of the network environment described with respect to FIG. 1 (such as UE 102, base station 106, or PDCCH enhancement engine 110).

Initially, at step 502, a signal comprising a first PDCCH is received at a UE. In aspects, the UE multiplies the first PDCCH by a first orthogonal code. Upon determining the result is not zero, the UE is able to interpret data corresponding to the signal. In other aspects, the UE multiplies the first PDCCH by a second orthogonal code. Upon determining the result is zero, the UE is unable to interpret data corresponding to the signal.

At step 504, the signal comprising a second PDCCH is received at the UE. The first PDCCH has a different length than the second PDCCH. In aspects, the UE multiplies the second PDCCH by a second orthogonal code. Upon determining the result is not zero, the UE is able to interpret data corresponding to the signal. In other aspects, the UE multiplies the second PDCCH by a first orthogonal code. Upon determining the result is zero, the UE is unable to interpret data corresponding to the signal.

In aspects, the first orthogonal code and the second orthogonal code is generated by the node. Prior to communicating the signal comprising the first PDCCH and the second PDCCH, the node may multiply the first PDCCH by the first orthogonal code and/or the second PDCCH by the second orthogonal code. The node may communicate the first PDCCH and the second PDCCH in PDCCH code space of the signal. In aspects, the PDCCH code space of the signal comprises the first three OFDM symbols of a subframe corresponding to the signal. The first PDCCH and the second PDCCH are communicated in the first OFDM symbol of the subframe. This enables the remaining PDCCH code space to be utilized for data.

Embodiments of the technology described herein may be embodied as, among other things, a method, a system, or a computer-program product. Accordingly, the embodiments may take the form of a hardware embodiment, or an embodiment combining software and hardware. The present technology may take the form of a computer-program product that includes computer-useable instructions embodied on one or more computer-readable media. The present technology may further be implemented as hard-coded into the mechanical design of network components and/or may be built into a broadcast cell or central server.

Computer-readable media includes both volatile and non-volatile, removable and non-removable media, and contemplate media readable by a database, a switch, and/or various other network devices. Network switches, routers, and related components are conventional in nature, as are methods of communicating with the same. By way of example, and not limitation, computer-readable media may comprise computer storage media and/or non-transitory communications media.

Computer storage media, or machine-readable media, may include media implemented in any method or technology for storing information. Examples of stored information include computer-useable instructions, data structures, program modules, and other data representations. Computer storage media may include, but are not limited to, RAM, ROM, EEPROM, flash memory or other memory technology, CD-ROM, digital versatile discs (DVD), holographic media or other optical disc storage, magnetic cassettes, magnetic tape, magnetic disk storage, and/or other magnetic storage devices. These memory components may store data momentarily, temporarily, and/or permanently, and are not limited to the examples provided.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Referring to FIG. 6, a block diagram of an exemplary computing device 600 suitable for use in implementations of the technology described herein is provided. In particular, the exemplary computer environment is shown and designated generally as computing device 600. Computing device 600 is but one example of a suitable computing environment and is not intended to suggest any limitation as to the scope of use or functionality of the invention. Neither should computing device 600 be interpreted as having any dependency or requirement relating to any one or combination of components illustrated. It should be noted that although some components in FIG. 6 are shown in the singular, they may be plural. For example, the computing device 60 might include multiple processors or multiple radios. In aspects, the computing device 600 may be a UE/WCD, or other user device, capable of two-way wireless communications with an access point. Some non-limiting examples of the computing device 600 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 6, computing device 600 includes a bus 610 that directly or indirectly couples various components together, including memory 612, processor(s) 614, presentation component(s) 616 (if applicable), radio(s) 624, input/output (I/O) port(s) 618, input/output (I/O) component(s) 620, and power supply(s) 622. Although the components of FIG. 6 are shown with lines for the sake of clarity, in reality, delineating various components is not so clear, and metaphorically, the lines would more accurately be grey and fuzzy. For example, one may consider a presentation component such as a display device to be one of I/O components 620. Also, processors, such as one or more processors 614, have memory. The present disclosure hereof recognizes that such is the nature of the art, and reiterates that FIG. 6 is merely illustrative of an exemplary computing environment that can be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 612 may take the form of memory components described herein. Thus, further elaboration will not be provided here, but it should be noted that memory 612 may include any type of tangible medium that is capable of storing information, such as a database. A database may be any collection of records, data, and/or information. In one embodiment, memory 612 may include a set of embodied computer-executable instructions that, when executed, facilitate various functions or elements disclosed herein. These embodied instructions will variously be referred to as "instructions" or an "application" for short.

Processor 614 may actually be multiple processors that receive instructions and process them accordingly. Presentation component 616 may include a display, a speaker, and/or other components that may present information (e.g., a display, a screen, a lamp (LED), a graphical user interface (GUI), and/or even lighted keyboards) through visual, auditory, and/or other tactile cues.

Radio 624 represents a radio that facilitates communication with a wireless telecommunications network. Illustrative wireless telecommunications technologies include CDMA, GPRS. TDMA. GSM, and the like. Radio 624 might additionally or alternatively facilitate other types of wireless communications including Wi-Fi, WiMAX, LTE, 3G, 4G, LTE, mMIMO/5G, NR, VoLTE, or other VoIP communications. As can be appreciated, in various embodiments, radio 624 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

The input/output (I/O) ports 618 may take a variety of forms. Exemplary I/O ports may include a USB jack, a stereo jack, an infrared port, a firewire port, other proprietary communications ports, and the like. Input/output (I/O) components 620 may comprise keyboards, microphones, speakers, touchscreens, and/or any other item usable to directly or indirectly input data into the computing device 600.

Power supply 622 may include batteries, fuel cells, and/or any other component that may act as a power source to supply power to the computing device 600 or to other network components, including through one or more electrical connections or couplings. Power supply 622 may be configured to selectively supply power to different components independently and/or concurrently.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for enhancing physical downlink control channel (PDCCH) capacity, the method comprising:
  communicating, by a node configured to wirelessly communicate with a user equipment (UE), a transmission to the UE, the transmission including:
    (1) a first PDCCH in a first orthogonal frequency division multiplexing (OFDM) symbol of a subframe; and
    (2) a second PDCCH generated by multiplying the first PDCCH by an orthogonal code and transmitted concurrently with the first PDCCH in a same OFDM symbol of the subframe;
  multiplying, for every transmission, the first PDCCH by a first orthogonal code to generate a first coded signal;
  multiplying the second PDCCH by a second orthogonal code to generate a second coded signal;
  transmitting, in a same OFDM symbol, both the first coded signal and the second coded signal; and
  utilizing a remaining PDCCH code space for data corresponding to the transmission.

2. The method of claim 1, wherein the PDCCH code space comprises the first three OFDM symbols of the subframe.

3. A method for enhancing physical downlink control channel (PDCCH) capacity, the method comprising:
  receiving at a user equipment (UE), a signal comprising a first PDCCH and a second PDCCH, the second PDCCH generated by multiplying the first PDCCH by an orthogonal code, wherein the first PDCCH and the second PDCCH are communicated in a first orthogonal frequency division multiplexing (OFDM) symbol of a subframe, and
  wherein the first PDCCH has a different length than the second PDCCH.

4. The method of claim 3, further comprising:
  multiplying the first PDCCH by a first orthogonal code; and
  upon determining the result is not zero, interpreting data corresponding to the signal.

5. The method of claim 3, further comprising:
  multiplying the first PDCCH by a second orthogonal code; and
  upon determining the result is zero, not interpreting data corresponding to the signal.

6. The method of claim 3, further comprising:
  multiplying the second PDCCH by a second orthogonal code; and
  upon determining the result is not zero, interpreting data corresponding to the signal.

7. The method of claim 3, further comprising:
  multiplying the second PDCCH by a first orthogonal code; and
  upon determining the result is zero, not interpreting data corresponding to the signal.

8. The method of claim 3, wherein a first orthogonal code and a second orthogonal code is generated by a node.

9. The method of claim 3, wherein the first PDCCH and the second PDCCH are communicated in PDCCH code space of the signal.

10. The method of claim 9, wherein the PDCCH code space of the signal comprises a first three OFDM symbols of a subframe corresponding to the signal.

11. A system for enhancing physical downlink control channel (PDCCH) capacity, the system comprising:
  a user equipment (UE); and
  a node configured to wirelessly communicate with the UE, wherein the node is configured to:
    (1) generate a second PDCCH by multiplying a first PDCCH by an orthogonal code; and
    (2) multiply the first PDCCH by a first orthogonal code to generate a first coded signal and multiply the second PDCCH by a second orthogonal code to generate a second coded signal; and
    (3) communicate, in PDCCH code space of a same orthogonal frequency-division multiplexing (OFDM) symbol, a signal to the UE, the signal including the first coded signal and the second coded signal.

12. The system of claim 11, wherein the PDCCH code space of the signal comprises a first three OFDM symbols of a subframe corresponding to the signal.

13. The system of claim 12, wherein the first PDCCH and the second PDCCH are communicated in a first OFDM symbol of the subframe.

14. The system of claim 13, further comprising utilizing a remaining PDCCH code space for data.

15. The system of claim 11, wherein the first PDCCH has a different length than the second PDCCH.

16. The system of claim 11, wherein the orthogonal code is generated by the node.

* * * * *